United States Patent [19]

Stephan et al.

[11] 4,447,400
[45] May 8, 1984

[54] METERING DEVICE

[75] Inventors: Hans-Werner Stephan, Cologne; Hermann Klein; Klaus Lehr, both of Hürth, all of Fed. Rep. of Germany

[73] Assignee: Hoechst Aktiengesellschaft, Fed. Rep. of Germany

[21] Appl. No.: 362,978

[22] Filed: Mar. 29, 1982

[30] Foreign Application Priority Data

Apr. 4, 1981 [DE] Fed. Rep. of Germany ....... 3113705

[51] Int. Cl.³ .................... C01B 25/023; B01J 4/00
[52] U.S. Cl. .................................. 422/150; 422/116; 423/322
[58] Field of Search ............... 422/150, 116, 202; 423/322; 251/335 B

[56] References Cited

U.S. PATENT DOCUMENTS

| 3,399,695 | 9/1968 | Stehlin | 251/335 B |
| 3,831,644 | 8/1974 | Berg et al. | 141/97 X |
| 4,273,752 | 6/1981 | Lehr et al. | 423/222 |
| 4,359,204 | 11/1982 | Williams | 251/335 B |

FOREIGN PATENT DOCUMENTS 2209937 9/1973 Fed. Rep. of Germany ... 251/335 B

Primary Examiner—Richard V. Fisher
Attorney, Agent, or Firm—Connolly and Hutz

[57] ABSTRACT

A device for metering liquid yellow phosphorus into a rotating ball mill for the production of red phosphorus therein includes a stationary outer tubular structure surrounding an inner tubular structure rotatably mounted therein. A valve having a valve rod associated with it is installed within the inner tubular structure near its end close to the ball mill. A plug provided with a central bore receiving the valve rod is installed within the inner tubular structure near its end remote from the ball mill. A bellows surrounds a portion of the valve rod inside the inner tubular structure, the bellows being tightly connected to the plug and valve rod.

6 Claims, 1 Drawing Figure

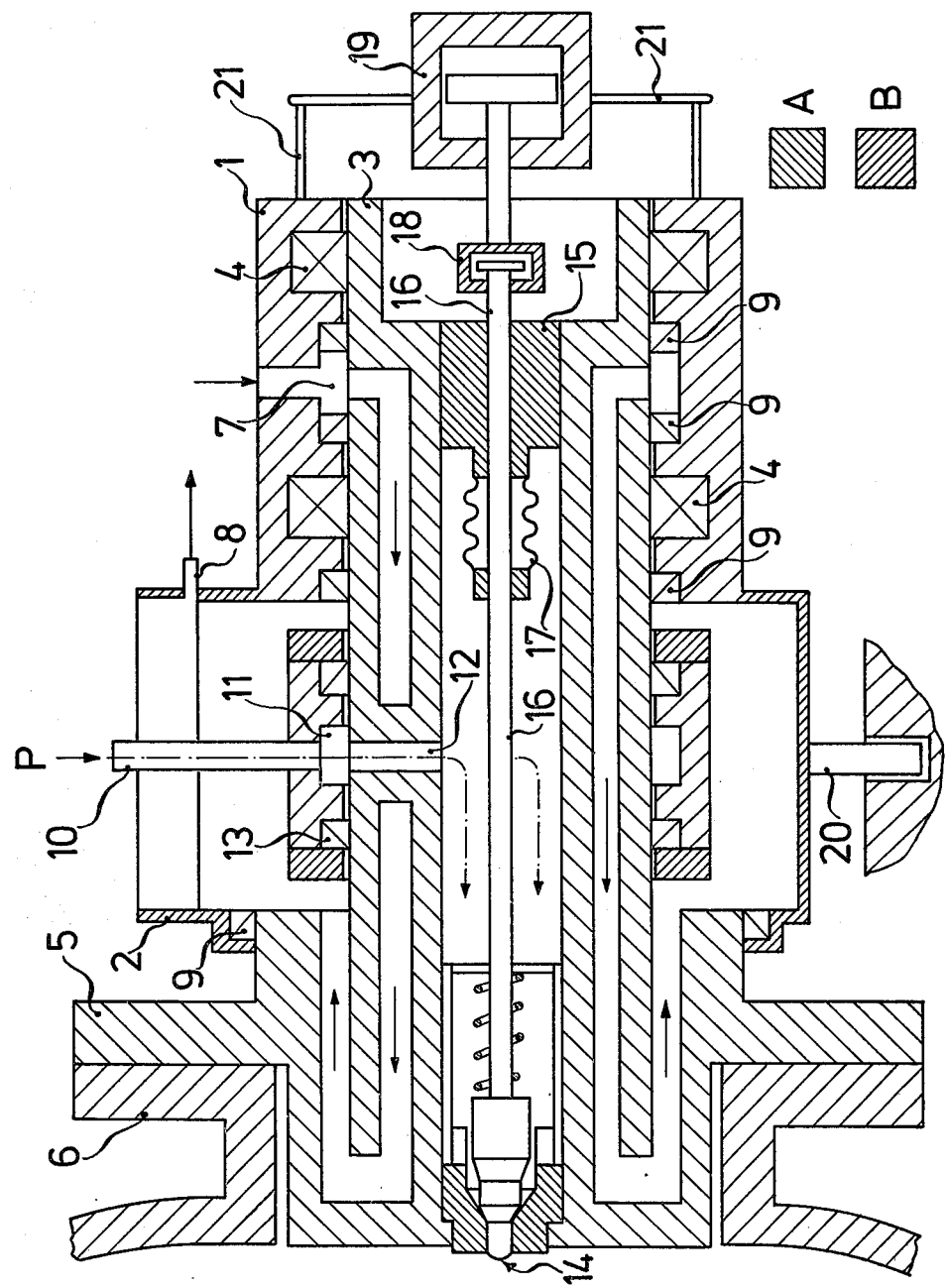

METERING DEVICE

The present invention relates to a device for metering liquid yellow phosphorus into a heated rotating ball mill for producing red phosphorus therein.

U.S. Pat. No. 4,273,752 (Lehr et al) discloses a process for making red phosphorus, wherein liquid yellow phosphorus is introduced into a closed, preheated ball mill in proportions per unit time which permit the reaction temperature inside the ball mill to be maintained without supply of heat from the outside. In carrying out this process, use is made of a dosing feeder which is secured to a hollow shaft forming part of the ball mill, the dosing feeder being comprised of a stationary angled yellow phosphorus feed pipe of which one arm is surrounded by a rotatable double-walled tubular structure connected to the ball mill, the arm and rotatable tubular structure being rendered gas-tight by means of a packing box. The rotatable tubular structure is formed, at its end portion facing the rotating drum, with a valve which can be opened and closed with the aid of a dosing rod; the rod is more particularly passed through the rotatable tubular structure and the arm of the feed pipe, and actuatable by means of a piston. A portion of the double-walled rotatable tubular structure is formed of two bellows, which are spaced apart from one another and arranged concentrically with respect to the dosing rod, compensating the strokes of the dosing rod.

An adverse effect encountered with the dosing feeder just described resides in the fact that the bellows are subject to dilatation and/or compression and also torsion during operation, i.e. to stresses which considerably affect the feeder's service life. Needless to say, the situation is particularly undesirable whenever warm water comes into contact with yellow phosphorus, in the event of the inner bellows becoming defective, during operation.

The present invention now provides a device permitting liquid yellow phosphorus to be metered into a ball mill, the device being free from bellows which are additionally subjected to torsional stress.

The present invention relates more particularly to a metering device comprising: a stationary outer tubular structure surrounding an inner tubular structure rotatably mounted therein; a valve having a valve rod associated with it being installed within the inner tubular structure near its end close to the ball mill; a plug provided with a central bore receiving the valve rod being installed within the inner tubular structure near its end remote from the ball mill; and a bellows surrounding a portion of the valve rod inside the inner tubular structure, the bellows being tightly connected to the plug and valve rod.

Further preferred features of the present invention provide:

(a) for the outer tubular structure to have a water tank rigidly connected thereto;
(b) for the water tank to have a tubular yellow phosphorus feeder passed therethrough, the feeder opening into an annular chamber;
(c) for the inner tubular structure to be formed with a vertically extending bore providing a flow connection between the annular chamber and the inside of the inner tubular structure;
(d) for the annular chamber to be formed with a packing box concentrically surrounding it;
(e) for the outer tubular structure to be formed with an annular channel permitting warm water to be admitted to hollow spaces inside the inner tubular structure;
(f) for the outer tubular structure to have an adjusting element with thrust rod secured thereto by means of spacers;
(g) for the thrust rod forming part of the adjusting element to be connected to a clutch which rotatably receives the disk-provided end of the valve rod;
(h) for the water tank to have a torque supporting means secured to its underside, the supporting means being anchored to the floor; and
(i) for the valve to be spring-loaded.

The device of this invention is formed with just one bellows which incidentally is subject only to dilatation and compression, respectively, compensating the strokes of the valve rod.

The invention will now be described with reference to the accompanying drawing showing the metering device diagrammatically and partially in section.

With reference thereto:

A stationary outer tubular structure 1 and a water tank 2 rigidly connected thereto are held in position by a torque supporting means 20 secured to the under side of water tank 2 and anchored to the floor. Rotatably mounted by means of ball bearings 4 in the stationary outer tubular structure 1 is an inner tubular structure 3. Near its head end portion, the inner tubular structure 3 is provided with a flange 5 which in turn is connected to a flange 6 secured to the ball mill. The hollow spaces inside the inner tubular structure 3 have water admitted thereto through an annular channel 7 formed in the outer tubular structure 1. The water inside the inner tubular structure 3 flows into the water tank 2 and can be taken therefrom via a duct 8. Radial shaft packings 9 permit the annular chamber 7, inner tubular structure 3 and water tank 2 to be tightly sealed. Yellow phosphorus is introduced into the inner tubular structure 3 through a feedpipe 10 provided with a warm water jacket heater, an annular chamber 11 formed in the outer tubular structure 1, and a bore 12 in the inner tubular structure 3, a packing box 13 being used to seal the annular chamber 11 and bore 12. The inner tubular structure 3 is formed, at its end portion close to the ball mill, with a spring-loaded valve 14 and, at its end remote from the ball mill, it is closed by means of a plug 15 having a central bore for passing the valve rod 16 therethrough. Inside the inner tubular structure 3, a portion of a valve rod 16 is surrounded by a bellows 17 which is tightly connected to the valve rod 16 and plug 15, respectively. The end portion (of valve rod 16) projecting outwardly from the plug 15 is operatively connected via a clutch 18 to an adjusting means 19, which is secured to the outer tubular structure 1 by spacers 21.

The metering device of this invention is operated as follows:

Warm water (about 60° C.) is initially admitted through annular channel 7 to the hollow spaces inside the inner tubular structure 3. From there, it travels into water tank 2 and ultimately into duct 8. Next, yellow phosphorus is pumped through feed pipe 10, annular chamber 11 and bore 12 into the inner tubular structure 3. More specifically, metered proportions of yellow phosphorus are introduced into the preheated rotating ball mill by timed opening of valve 14 with the aid of valve rod 16 and adjusting means 19. The periods during which the valve 14 is kept open or closed are selected so as to permit maintaining a given temperature inside the ball mill without supply of heat from the outside.

In the accompanying drawing, hatch A relates to rotating structural parts while hatch B relates to stationary structural parts of the present metering device.

We claim:

1. A device for metering liquid yellow phosphorus into a rotating ball mill for the production of red phosphorus therein, comprising an inner tubular structure rigidly connected to the rotating ball mill and an outer tubular structure partially concentrically surrounding the inner tubular structure, a valve within the inner tubular structure near its end close to the ball mill, a valve rod connected to the valve and extending generally parallel to the inner tubular structure, the valve rod having a disk at its end remote from the ball mill, an annular chamber surrounding the inner tubular structure, a bore in the inner tubular structure extending between the annular chamber and the inside of the inner tubular structure, a tubular yellow phosphorus feeder opening into the annular chamber, a plug having a central bore slidably receiving the valve rod and secured within the inner tubular structure near its end remote from the ball mill, a bellows surrounding a portion of the valve rod inside the inner tubular structure and tightly connected between the plug and valve rod, an adjusting element having a thrust rod and secured to the outer tubular structure, and a clutch connected to the thrust rod and rotatably receiving the disk of the valve rod whereby the valve is opened upon activation of the adjusting element.

2. The device as claimed in claim 1, wherein the outer tubular structure has a water tank rigidly connected thereto, and wherein the tubular yellow phosphorus feeder passes through the water tank.

3. The device as claimed in claim 2, wherein the water tank has a stationary torque supporting means secured to its underside.

4. The device as claimed in claim 1, wherein the annular chamber is formed with a packing box concentrically surrounding it.

5. The device as claimed in claim 1 wherein the outer tubular structure includes an annular channel, hollow spaces inside the inner tubular structure communicating with the annular channel, and warm water supplied to the annular channel for delivery to the hollow spaces inside the inner tubular structure.

6. The device as claimed in claim 1, wherein the valve is spring-loaded.

* * * * *